US008147743B2

(12) United States Patent
Schuren et al.

(10) Patent No.: US 8,147,743 B2

(45) Date of Patent: Apr. 3, 2012

(54) METHOD FOR DEFORMING A PLASTIC PLATE

(75) Inventors: Gerardus Wilhelmus Schuren, Heel (NL); Dennis Gustav Rasmusson, Oskarström (SE)

(73) Assignee: Trespa International B.V., Weert (NL)

( * ) Notice: Subject to any disclaimer, the term of this patent is extended or adjusted under 35 U.S.C. 154(b) by 563 days.

(21) Appl. No.: 11/791,416

(22) PCT Filed: Nov. 24, 2005

(86) PCT No.: PCT/NL2005/000812

§ 371 (c)(1), (2), (4) Date: Jun. 8, 2007

(87) PCT Pub. No.: WO2006/057558

PCT Pub. Date: Jun. 1, 2006

(65) Prior Publication Data

US 2008/0012182 A1 Jan. 17, 2008

(30) Foreign Application Priority Data

Nov. 24, 2004 (NL) .................................... 1027579

(51) Int. Cl.
*B27N 3/18* (2006.01)

(52) U.S. Cl. ......... 264/319; 264/299; 264/239; 264/241

(58) Field of Classification Search .................. 264/319
See application file for complete search history.

(56) References Cited

U.S. PATENT DOCUMENTS

| | | | | |
|---|---|---|---|---|
| 2,759,837 | A * | 8/1956 | Roberts | 162/13 |
| 4,325,899 | A | 4/1982 | Cole et al. | 264/86 |
| 4,503,115 | A * | 3/1985 | Hemels et al. | 442/161 |
| 4,757,119 | A * | 7/1988 | Wiggins et al. | 525/504 |
| 4,789,604 | A | 12/1988 | Van Der Hoeven | 428/503 |
| 4,801,495 | A | 1/1989 | Van Der Hoeven | 428/286 |
| 5,368,803 | A * | 11/1994 | Brow et al. | 264/257 |
| 5,951,939 | A * | 9/1999 | Chernyak et al. | 264/522 |
| 6,638,457 | B2 * | 10/2003 | Inagaki | 264/113 |

FOREIGN PATENT DOCUMENTS

| | | |
|---|---|---|
| EP | 0 243 423 | 11/1987 |
| EP | 0 420 831 | 4/1991 |

(Continued)

OTHER PUBLICATIONS

Lignin Plasticization to Improve Binderless Fiberboard Mechanical Properties J Bouajila; A Limare; C Joly; P Dole Polymer Engineering and Science; Jun. 2005; 45, 6; Research Library p. 809.*

(Continued)

*Primary Examiner* — Yogendra Gupta
*Assistant Examiner* — John Robitaille
(74) *Attorney, Agent, or Firm* — Roberts & Roberts, LLP

(57) ABSTRACT

The present invention relates to a method for deforming a plastic plate comprising a core of resin-treated fibers, wherein the plate is obtained by-compression under elevated pressure and temperature conditions and the plate thus obtained is deformed in a mold (1, 2, 3), characterized in that the plastic plate must have a temperature in the range of (Tg+15"C)-(Tg+115"C) prior to being deformed in the mold, wherein Tg ("C) is the deformation or glass transition temperature of the plastic plate.

19 Claims, 1 Drawing Sheet

1 4 5 3 3 4 2 5

FOREIGN PATENT DOCUMENTS

| | | |
|---|---|---|
| EP | 0 424 909 | 5/1991 |
| EP | 0 705 680 | 4/1996 |
| EP | 1 477 303 | 11/2004 |
| GB | 999 696 | 7/1965 |
| GB | 2 139 944 | 11/1984 |
| JP | 2000158421 | 6/2000 |

OTHER PUBLICATIONS

International Committee of the Decorative Laminates Industry (ICDLI), "Characteristics and Possibilities of Use for Decorative High Pressure Laminates (HPL)"; p. 1-7, Oct. 2006.

* cited by examiner

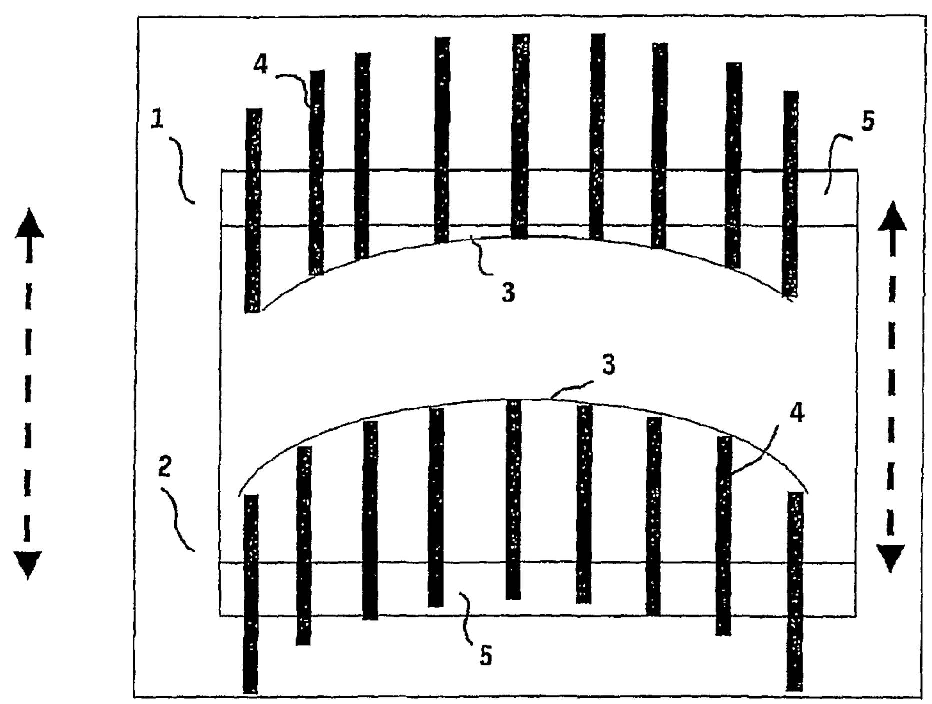
4
1
5
3
3
4
2
5

METHOD FOR DEFORMING A PLASTIC PLATE

BACKGROUND OF THE INVENTION

The present invention relates to a method for deforming a plastic plate comprising a core of resin-treated fibres, which plate is compressed in a press under elevated pressure and temperature conditions and deformed in a mould.

Such a method is known from European patent application EP 0 705 680 as previously filed in the present applicant's name. According to the method that is known therefrom, a layer package consisting of a core and facing layers laminated on the core on both sides is compressed, using heat, at a pressure of 6 to 90 bar and a maximum temperature of 145 to 160° C. to obtain a plastic plate. During this pressure treatment the resin present in the core layer is not completely cured, so that the plate thus obtained can be deformed in a subsequent heating step. After termination of the pressure treatment the plate is heated asymmetrically in a second step between an upper heating plate, which is heated to a temperature in the range of 150 to 190° C., and a lower heating plate, which has a temperature in the range of 20 to 60° C., with the duration of the heating step being approximately 1 to 10 minutes, dependent on the thickness of the plate. After the plate has thus been asymmetrically heated, it is transferred to a bending unit in which the incompletely cured core layers are plastically deformed, using compression. Finally, to reduce internal stress and to improve the mechanical material properties, the thus deformed plate is transferred to an immersion bath, in which the deformed plate remains fixed in the mould by means of clamps. The post-curing that takes place here at a temperature of 120 to 160° C. is made possible by the fact that the immersion bath consists of a plasticizer. A drawback of such a method of deforming is that three separate operations have to performed, in which especially the post-curing step in the immersion bath is experienced as disadvantageous, especially in view of the chemicals that are used. Moreover, a loss of chemicals occurs upon removal of the deformed plate from the immersion bath, which increases the costs.

From European patent application No. 0 424 909 a method is known in which a plate of cellulose containing particles is obtained through compression and is transformed into a stable final shape by the application of pressure and heat, with the second pressing operation taking place under a significantly higher pressure.

From British patent application No. 2 139 944 a method is known for bending and moulding medium density fibreboard (MDF), in which the MDF plate is first subjected to a softening treatment, using dry or wet heat, and is subsequently bent and fixed in the bent shape by heating to a temperature of 300° C.

From U.S. Pat. No. 4,801,495 granted to the present applicant a decorative panel is furthermore known which comprises a core, with a decorative layer on one or both surfaces of the core, and an outermost layer on at least one surface of the panel, which outermost layer mainly comprises a synthetic resin of one or more radiation-polymerisable compounds. Examples of core materials are non wovens or mats of mineral fibres, paper, fibre glass, synthetic fibres and mixtures thereof.

In addition, from U.S. Pat. No. 4,789,604 granted to the present applicant a decorative panel having at least one matt decorative side is known, which panel comprises a core, with a decorative layer on one or both surfaces of the core, and an outermost layer on at least one surface of the panel, which outermost layer mainly comprises a synthetic resin of one or more radiation-polymerisable compounds. Panels or foils of a plastic material or a metal are mentioned as core materials.

SUMMARY OF THE INVENTION

The object of the present invention is to provide a method for deforming plastic plates, by means of which bent elements can be obtained in a simple manner.

Another object of the present invention is to provide a method for deforming plastic plates, wherein the degree of bending of the deformed plastic plate can be influenced by manipulating the process conditions.

Yet another object of the present invention is to provide a method for deforming plastic plates, wherein the already bent plates hardly spring back to their original form, if at all.

BRIEF DESCRIPTION OF THE DRAWING

FIG. 1 is a schematic representation of a mold suitable for the method of the invention.

DETAILED DESCRIPTION OF THE INVENTION

The present method as referred to in the introduction is characterized in that the plastic plate must have a temperature in the range of (Tg+15° C.)-(Tg+115° C.) prior to being deformed in the mould, wherein Tg (° C.) is the deformation or glass transition temperature of the plastic plate.

The present inventors have found that when a temperature lower than (Tg+15° C.) is used during deformation in the mould, problems occur in the deforming step. In particular there is a great chance that the thus deformed plastic plate will spring back partly to its original state. In other words, the intended deformation is reversible. The inventors have also experienced that at such low deforming temperatures problems occur in the form of ruptures and cracks. Undesirable discolouring and blistering occurs at a temperature higher than (Tg+115° C.). The type of fibre, such as the length, the thickness and the orientation, influences the Tg-value. The resin's pH-value and the pressure conditions determine to a significant extent the degree of crosslinking of the resin. The present inventors have thus found that the Tg-value is influenced by both the fibre geometry and the degree of crosslinking. Thus the Tg-value of the plate is influenced and consequently also the deformability. The present inventors have consequently found that the plastic plate must have a Tg-value of at least 70° C. This means that the Tg-value is an important measure of the deformability of the plate, especially with regard to maintaining the intended deformation thereof, viz. preventing undesirable springback. Thus it has appeared that a low-reactivity resin type will lead to a lower Tg-value than a high-reactivity resin type. A short curing time will also lead to a lower Tg-value than a longer curing time. A low pH-value of the fibre leads to a low Tg-value, with the length/diameter ratio of the fibre exhibiting an increase in the Tg-value when the aforementioned ratio increases. Another fibre parameter is the orientation, i.e. the length/width ratio, which exhibits a decrease in the Tg-value in the case of a decreasing size. To achieve a stable deforming of the final plate, the present inventors have found that the Tg-value must amount to at least 70° C. Too low a Tg-value results in a high risk of blistering and is undesirable, therefore. In addition, the plates obtained through deformation in the mould must comply with the NEN-EN438 (2005) norm.

Consequently it is desirable that the thus compressed plate be heated after the compression step, prior to the final deformation in the mould, with this intermediate heating step or the preheating step taking place in the range (Tg+15)-(Tg+115), wherein Tg is the deformation or glass transition temperature of the plastic plate. It is possible that the temperature is not uniform across the thickness of the plastic plate and that the difference in temperature varies in dependence on the thickness of the plate and the duration of the heating step.

In practice, large stocks of compressed plastic plates will often be built up, so that the plates will not immediately be subjected to a deforming or bending treatment. After the compressed plates have been taken from the press, the plates are stored and only taken from the stores at the moment they are to be deformed. To be able to perform the deforming step, it is in particular desirable that the plastic plates be heated to a temperature of (Tg+35)-(Tg+85), wherein Tg is the deformation or glass transition temperature.

With the above compression method, the plastic plate is compressed to its final thickness.

The plastic plate consisting of a core of resin treated fibres may be provided with a decorative surface on one or both sides, which decorative surface may comprise a decorative coating, especially a coating cured by electron radiation. Such a decorative coating comprises a synthetic resin layer on basis of one or more radiation-curable components. In certain embodiments the decorative layer may also comprise melamine or urea or melamine/urea impregnated decorative papers. In a specific embodiment, the decorative layer may also consist of a combination of radiation-curable components and heat-curable components.

It is preferable that a resin from the group of unsaturated acrylates and methacrylates is used as a synthetic resin.

The fact is that such a group of compounds results in rigid networks after polymerisation of the synthetic resin.

It is preferable that the synthetic resin is composed of an oligomer of epoxy and acrylate or silicon and acrylate, preferably an oligomer of polyester and acrylate and especially an oligomer of urethane and acrylate or the corresponding oligomers of methacrylate as prepolymers, which are capable of radiation-polymerisation, which have been radiation-polymerised, if desired with a mono, tetra, penta, and/or hexa-acrylate, preferably a diacrylate or triacrylate of polyols or ether polyols or the corresponding methacrylates.

From the point of view of good surface characteristics of the plastic plate it is furthermore preferable that the prepolymer according to the present invention is an aliphatic oligomer of urethane and acrylate, which has been radiation-polymerised with a diacrylate or triacrylate.

A resin-impregnated non-woven fabric may be used as a thermosetting composite. Also densified fibre mats can be considered to be non-woven fabrics. Such mats are, for example, obtained by scattering fibres onto a conveyor belt, possibly followed by a pre-densification step, using temperature increases and decreases, as disclosed in U.S. Pat. No. 4,503,115 in the name of the present applicant.

In a special embodiment, a thermosetting composite is used as the core layer, which thermosetting composite preferably comprises a number of layers of resin impregnated paper. Thus a thermosetting composite of any desired thickness can be manufactured by altering the number of layers of paper, the thickness and the amount of resin.

The following fibres can be mentioned as suitable fibres for use in the non-woven fabric of the core layer: cellulose containing fibres, such as especially wood fibres, cotton and paper fibres, and furthermore polyester fibres, glass fibres, mineral wool fibres, mineral composite fibres or combinations thereof.

The resins used for the core layer are preferably individually selected from the group consisting of phenol resins, melamine resins, urea resins, epoxy resins, polyester resins, poly-isocyanate resins, polyurethane acrylate or combinations thereof. The use of such resins leads to a strong and rigid resin network, which contributes towards the constructional qualities of the present plastic plate.

The fibres used in the core may be randomly or partly oriented, for example in the paper. If desired, the fibres may have been pre-treated, for example with a resin, or have been subjected to a follow-up treatment, for example with a resin. Additives such as fire retardants, colourants, plasticizers, crosslinkers, stabilisers agents and durability enhancing agents may be added to the resin or the fibres, or to both components.

The plate is heated on one side, preferably on both sides, using a temperature in the range of 100 to 200° C., a pressure in the range of 5 to 120 bar and a residence time in the press of 5 to 150 minutes. In particular, the plate is heated on both sides in the press, using a temperature in the range of 140 to 160° C., a pressure in the range of 30 to 80 bar and a residence time in the press of 10-100 minutes.

After the plastic plates have been subjected to a heat treatment, the heated plastic plates are transferred to a mould or a bending unit, where the plastic plate is bent to the desired curvature, with the deformation in the mould taking place at a differential pressure of at least 0.02 bar, in particular at a differential pressure of at least 0.3 bar. In a specific embodiment it is also possible to carry out the deforming process under a reduced pressure, with a pressure lower than 0.9 bar, in particular lower than 0.7 bar, being preferable.

The residence time in the mould for deformation depends on the thickness of the plastic plate and the degree of cooling, after which the plastic plate is removed from the mould and will spring back slightly. However, by selecting the appropriate Tg-value for the plate obtained after the compression step and subsequently suitably setting the temperature conditions for the heating step, before the bending step is carried out, it is possible to influence the degree of springback. In a special embodiment, the plastic plate is preferably cooled in the mould to a temperature lower than the Tg-value, preferably to a temperature lower than (Tg−30° C.), after deformation.

In a special embodiment of the present method, the deformation of the plastic plate may also take place in a mould at an elevated temperature, in particular a temperature in the range of (Tg+15)-(Tg+115), wherein Tg is the deformation or glass transition temperature, and a differential pressure of at least 0.02 bar.

The density of the panel obtained with the present method is at least 1000 kg/m$^3$, in particular at least 1200 kg/m$^3$, preferably more than 1350 kg/m$^3$, and the thickness is preferably at least 3 mm.

In such an embodiment the step of intermediate heating or supplementary heating after the compression of the plastic plate is left out, so that the present method actually comprises two steps, viz. compression or compaction to a flat plate and subsequently bending the flat plate into a curved plate under elevated temperature conditions.

In another special embodiment, the plastic plate is preferably heated in the mould to a temperature in the range of (Tg+35)-(Tg+85), wherein Tg is the deformation or glass transition temperature, and a differential pressure of at least 0.02 bar, more specifically at least 0.3 bar.

The supplementary heating of the already compressed plate may take place by electric heating, oil heating, steam heating, infrared heating, near-infrared heating and/or by means of microwaves, for example. It is desirable that the heating takes place rapidly, preferably in less than 15 minutes.

The present method is further characterized in that the deformation in the mould takes place in such a way that the radius of the thus deformed plate is substantially identical to the radius of the mould, more specifically, that the radius of the plate deformed in the mould is maximally 40%, in particular maximally 20% larger than the radius of the mould.

The degree of springback of the plate that has been bent in the mould can be influenced by suitably selecting the heating step temperature, but also the cooling temperature after the deformation step in the mould or the supplementary heating step. Moreover, by manipulating the curvature of the mould it can be ensured that a plastic plate having a predetermined curvature is obtained. The present inventors have furthermore found that the plate deformed in the mould can be held in a fixed position, possibly by using one or more clamped connections. This can take place by keeping the mould closed or by removing the deformed plate from the mould and placing it into a clamping device. A mould suitable for the present method is schematically shown in the enclosed FIGURE, in which connection it is noted that such an embodiment only serves to illustrate the invention.

The mould comprises two parts, viz. an upper die 1 and a lower die 2, both provided with a cover plate 3. In a specific embodiment, the upper die 1 and the lower die 2 are provided with heating means. The curvature of the cover plate 3 can be influenced by means of rods 4. These rods 4 can be moved into and out of the pressure element 5. The plastic plate to be heated (not shown) is placed between the lower die 2 and the upper die 1, particularly between the two cover plates 3, after which the dies 1 and 2 are moved together in the direction of the arrows, so that the plastic plate is clamped been them and subsequently deformed. After the deformation has taken place, the upper die 1 and the lower die 2 are cooled, for example by passing cold air along the rods 4, after which the thus deformed plastic plate is removed from the mould by removing the upper die 1 and the lower die 2.

The Tg for a thermosetting composite is determined by carrying out a DMTA measurement. The measurement method that is used is a three-point bending method performed at a frequency of 1 Hz, at a heating rate of 10° C./minute, a starting temperature of 20° C. and a final temperature of 220° C. The sample size L×W×D=50×10×3 mm.

The present invention will be explained below by means of a number of examples, in which connection it must be noted in particular that the present invention is under no circumstances limited to such special examples.

EXAMPLES 1-6

A layer package consisting of a core of wood fibres and a phenol resin, with both sides of the core being provided with a decorative surface consisting of a pigmented layer on basis of acrylic resin cured by means of electron radiation, was compressed and cured to a density of 1400 kg/m$^3$ at a temperature of 150° C., a pressure of 80 bar and a residence time of 15 minutes. A 10 mm thick plastic plate was thus obtained.

The thus manufactured plastic plate was subjected to a heating step, which heating was terminated when a predetermined temperature in the centre of the plastic plate was reached. The plastic plate was subsequently transferred to a mould having a radius of 500 mm, in which it was deformed, using an absolute pressure of 1.3 bar, viz. a differential pressure of 0.3 bar. The plastic plate was subsequently cooled in the mould to a temperature 30° C. below the deformation or glass transition temperature of the plastic plate. After cooling, the mould was opened and the thus deformed plastic plate sprung back slightly, reaching its final shape. The present inventors have furthermore found that for a plastic plate having a Tg-value of 90° C. the cooling temperature of the mould played a role in the degree of springback (see table 2).

The table 1 below shows the various process conditions.

TABLE 1

| Example | Resin type | Fibre type | Tg after compression | Temperature during intermediate heating step | Final radius of plastic plate after cooling |
|---|---|---|---|---|---|
| 1 | Phenol resin | Air-scattered wood fibres | 90 | 125 | 676 |
| 2 | Phenol resin | Air-scattered wood fibres | 90 | 140 | 622 |
| 3 | Phenol resin | Air-scattered wood fibres | 90 | 155 | 608 |
| 4 | Phenol resin | Air-scattered wood fibres | 90 | 170 | 580 |
| 5 | Phenol resin with plasticizer | Air-scattered wood fibres | 85 | 155 | 572 |
| 6 | Phenol resin with flame retardants | Air-scattered wood fibres | 95 | 155 | 598 |

The above Table 1 shows that the higher the temperature of the intermediate heating step, the less the final plastic plate will spring back. Moreover, the addition of a certain additive, such as a plasticizer (Example 5), will ensure that the final plastic plate will spring back to a lesser extent (see Example 3). Conversely, the addition of another additive, such as flame retardants, to the phenol resin has resulted in the plastic plate only springing back slightly less (Example 6) in comparison with the embodiment in which no fire retardant agents (see Example 3) have been added.

TABLE 2

| Temperature at which the deformed plate is removed from the mould, ° C. | % springback |
|---|---|
| 25 | 9 |
| 40 | 9 |
| 50 | 9 |
| 60 | 12 |
| 80 | 19 |
| 100 | 29 |

Table 2, in which a plastic plate having a Tg-value of 90° C. was subjected to different cooling temperatures after being deformed in a mould, shows that a cooling temperature higher than the Tg-value of the plastic plate led to 29% springback, while a cooling temperature lower than 50° C. does not show any improvement as regards the springback performance, viz. a value of 9% was observed both for 25° C. and for 40° C.

TABLE 3

| | Measured values | Mould radius, cm | Radius after deformation, cm |
|---|---|---|---|
| | Resin type | | |
| Comparative Example 1 | Very reactive | 50 | 60.1 |
| Example 7 | Reactive | 50 | 59.3 |
| Example 8 | Not very reactive | 50 | 57.5 |

TABLE 3-continued

| | Measured values | Mould radius, cm | Radius after deformation, cm |
|---|---|---|---|
| | Curing | | |
| Example 9 | Long | 44 | 51.8 |
| Example 10 | Standard | 44 | 50.5 |
| Example 11 | Short | 44 | 49.3 |
| | Fibre type | | |
| Comparative Example 2 | Kraft paper | 44 | 76 |
| Example 12 | Wood fibre | 50 | 57.5 |

EXAMPLES 7-12 AND COMPARATIVE EXAMPLES 1-2

The actions of Examples 1-6 were repeated, except that the type of resin (Comparative Example 1, Examples 7-8), the duration of the post-curing step (Examples 9-11) and the type of fibre (Comparative Example 2 and Example 12) were changed. Table 2 clearly shows that a very reactive type of resin resulted in a curved element having a radius of 60.1 cm after deformation in a mould having a radius of 50 cm. This means that a very reactive type of resin results in a curved element that tends to spring back more to the original, flat configuration after being deformed, which flat configuration is not achieved, however. On the other hand, if a reactive (Example 7) or not very reactive (Example 8) type of resin is used, a curved element is obtained of which the final radius is within 20% of the original radius of the mould. From table 2 it is furthermore apparent that a long curing time leads to a higher degree of springback (Example 9) compared with a short curing time (Example 11), where there is almost no springback. Comparative Example 2 clearly shows that the use of Kraft paper as the fibre type results in a curved element that exhibits a considerable degree of springback.

On the basis of the above data it will be understood that the plastic plate, obtained after compression under elevated pressure and temperature conditions, must have a Tg-value of at least 70° C. to enable subsequent deformation thereof in a mould, with the moulded element thus formed hardly springing back to its original, flat configuration, if at all.

The invention claimed is:

1. A method for deforming a plastic plate comprising a core of resin-treated fibers, the method comprising compressing the plate by compression in a press under elevated pressure and temperature conditions in a compression step, and then deforming the plate in a mould in a deformation step, wherein the plastic plate has a temperature in the range of (Tg+15° C.)-(Tg+115° C.) prior to being deformed in the mould and during the deformation step, wherein Tg (° C.) is the deformation or glass transition temperature of the plastic plate and the Tg is at least 70° C., wherein the Tg is determined by a DMTA measurement, a three point bending method performed at a frequency of 1 Hz, at a heating rate of 10° C./minute, a starting temperature of 20° C. and a final temperature of 220° C.; and wherein after the deformation step, the deformed plastic plate is cooled in the mould to a temperature that is at least 30° C. lower than the Tg-value of the plastic plate.

2. The method according to claim 1, wherein the plastic plate is heated to a temperature of (Tg+35° C.)-(Tg+85° C.), during the deformation step.

3. The method according to claim 1, wherein the compression step is carried out in such a manner that the plate is heated on both sides, at a temperature in the range of 100-200° C., a pressure in the range of 5-120 bar and a residence time in a press of 5-150 minutes.

4. The method according to claim 3, wherein the compression step is carried out in such a manner that the plate is heated on both sides, at a temperature in the range of 140-160° C., a pressure in the range of 30-80 bar and a residence time in a press of 10-100 minutes.

5. The method according to claim 1 wherein the deforming in the mould takes place at a differential pressure of at least 0.02 bar.

6. The method according to claim 5, wherein the deforming in the mould takes place at a differential pressure of at least 0.3 bar.

7. The method according to claim 1 wherein during the deformation step the plastic plate is heated in the mould to a temperature in the range of (Tg+15° C.)-(Tg+115° C.), and a differential pressure of at least 0.02 bar.

8. The method according to claim 7, wherein during the deformation step the plastic plate is heated in the mould to a temperature in the range of (Tg+35° C.)-(Tg+85° C.), and a differential pressure of at least 0.3 bar.

9. The method according to claim 1 wherein the plate is heated after being compressed and subsequently heated in a mould.

10. The method according to claim 9, wherein said heating takes place by electric heating, steam heating, infrared heating, near-infrared heating and/or by means of microwaves.

11. The method according to claim 10, wherein said heating is carried out within a period of maximally 15 minutes.

12. The method according to claim 1 wherein the fibers comprise wood.

13. The method according to claim 1 wherein the plastic plate has a density of at least 1000 kg/m$^3$.

14. The method according to claim 1 wherein the deformation step in the mould takes place in such a way that a radius of the plastic plate after the deformation step is substantially identical to a radius of the mould.

15. The method according to claim 14 wherein the deformation step in the mould takes place in such a way that a radius of the plastic plate after the deformation step is maximally 40% larger than the radius of the mould.

16. The method according to claim 2 wherein the deforming in the mould takes place at a differential pressure of at least 0.02 bar.

17. The method according to claim 3 wherein the deforming in the mould takes place at a differential pressure of at least 0.02 bar.

18. The method according to claim 4 wherein the deforming in the mould takes place at a differential pressure of at least 0.02 bar.

19. The method according to claim 1, wherein the deforming in the mould takes place at a differential pressure of at least 0.3 bar.

* * * * *